(12) United States Patent
Costin, Sr. et al.

(10) Patent No.: US 8,071,912 B2
(45) Date of Patent: Dec. 6, 2011

(54) ENGINEERED WOOD FIBER PRODUCT SUBSTRATES AND THEIR FORMATION BY LASER PROCESSING

(75) Inventors: Darrel Costin, Sr., Westlake Village, OH (US); Darrel Costin, Jr., Avon, OH (US)

(73) Assignee: TechnoLines, LP, Westlake, OH (US)

( * ) Notice: Subject to any disclaimer, the term of this patent is extended or adjusted under 35 U.S.C. 154(b) by 1134 days.

(21) Appl. No.: 11/420,543

(22) Filed: May 26, 2006

(65) Prior Publication Data

US 2007/0108170 A1 May 17, 2007

Related U.S. Application Data (60) Provisional application No. 60/737,127, filed on Nov. 16, 2005, provisional application No. 60/772,483, filed on Feb. 13, 2006, provisional application No. 60/744,081, filed on Mar. 31, 2006, provisional application No. 60/745,023, filed on Apr. 18, 2006.

(51) Int. Cl.
*B23K 26/00* (2006.01)

(52) U.S. Cl. .................................. 219/121.85

(58) Field of Classification Search ............. 219/161.68, 219/121.69, 11.68, 121.692; 700/166, 131, 700/132
See application file for complete search history.

(56) References Cited

U.S. PATENT DOCUMENTS

| | | | |
|---|---|---|---|
| 4,024,545 A | 5/1977 | Dowling et al. | |
| 4,480,169 A * | 10/1984 | Macken | 219/121.68 |
| 4,629,858 A | 12/1986 | Kyle | |
| 4,847,184 A | 7/1989 | Taniguchi | |
| 4,861,620 A | 8/1989 | Azuma | |
| 4,947,022 A | 8/1990 | Ostroff et al. | |
| 5,190,791 A | 3/1993 | Gunter et al. | |
| 5,200,592 A | 4/1993 | Yabu | |
| 5,329,381 A * | 7/1994 | Payne | 358/3.29 |
| 5,480,308 A * | 1/1996 | Boundy et al. | 434/296 |
| 5,521,628 A * | 5/1996 | Montgomery | 347/243 |
| 5,660,668 A | 8/1997 | Matheson | |
| 5,990,444 A * | 11/1999 | Costin | 219/121.69 |
| 6,002,099 A * | 12/1999 | Martin et al. | 219/121.69 |
| 6,489,985 B1 | 12/2002 | Brodsky et al. | |
| 6,685,868 B2 | 2/2004 | Costin | |
| 6,819,972 B1 * | 11/2004 | Martin et al. | 700/166 |
| 2003/0047253 A1 | 3/2003 | Robinson et al. | |
| 2003/0057609 A1 | 3/2003 | Ratcliffe | |

(Continued)

FOREIGN PATENT DOCUMENTS

CN 1361021 A 7/2002

(Continued)

OTHER PUBLICATIONS

English Abstract of CN 1361021 to Jinsong (Jul. 31, 2002).

(Continued)

*Primary Examiner* — Henry Yuen
*Assistant Examiner* — Thien Tran
(74) *Attorney, Agent, or Firm* — Berenato & White, LLC (57) ABSTRACT

A laser is used to a form information indicative of a pattern on a surface of a support piece formed from a compressed wood fiber product substrate. The pattern can be a wood grain. The field of the laser is increased, to allow lazing more of the material at once. According to an embodiment, the field is increased in a way that does not reduce the resolution of the lasing.

28 Claims, 5 Drawing Sheets

LASER SYSTEM

U.S. PATENT DOCUMENTS

| | | |
|---|---|---|
| 2004/0022036 A1 | 2/2004 | Suzuki |
| 2005/0006019 A1 | 1/2005 | Ratcliffe |
| 2005/0095408 A1 | 5/2005 | Labrec et al. |
| 2005/0155500 A1 | 7/2005 | Latos et al. |
| 2006/0096437 A1* | 5/2006 | Plant ............................... 83/879 |

FOREIGN PATENT DOCUMENTS

| | | |
|---|---|---|
| GB | 2294656 | 5/1996 |
| JP | 60127102 | 7/1985 |
| WO | WO 93/22944 | 11/1993 |
| WO | WO 2006/031169 A1 * | 9/2005 |
| WO | 2006/031169 | 3/2006 |
| WO | 2006031169 | 3/2006 |
| WO | 2006/090287 | 8/2006 |
| WO | 2006090287 | 8/2006 |

OTHER PUBLICATIONS

English Abstract of CN 1082475 to Zhang et al. (Feb. 23, 1994).
Study on Laser Removing and Forming Technical Methods of Wood, Xiaohua Tang et al., Forestry Machinery and Woodworking Equipment, vol. 30, issue 7, pp. 10 to 12, Jul. 30, 2002.

* cited by examiner

FIGURE 1: LASER SYSTEM

FIGURE 2: 2 LASER SYSTEM

FIGURE 3: SPLIT BEAM SYSTEM

FIGURE 4: 2-LASER PRINT ON THE FLY LASER SYSTEM

FIGURE 5: ALTERNATE LASER SYSTEM

ENGINEERED WOOD FIBER PRODUCT SUBSTRATES AND THEIR FORMATION BY LASER PROCESSING

PROVISIONAL PRIORITY

This application claims the priority of provisional application Nos. 60/737127, filed Nov. 16, 2005; 60/772,483 filed Feb. 13, 2006; 60/744,081, filed Mar. 31, 2006; and 60/745,023, filed Apr. 18, 2006, the contents of all of which are herewith incorporated by reference.

BACKGROUND

Engineered wood fiber products with a variety of different surfacing materials find wide application in commercial and residential countertops, bathroom fixtures, store fixtures, trade show displays, flooring and wall panels, furniture and a host of other building material interior components. A typical engineered wood fiber product substrate may be formed of MDF (medium density fiberboard), particle board, or products manufactured from wood fiber products—which can include wood fragments, sawdust, or any other wood parts, with various resins.

MDF is a common wood fiber product material consisting of about 92% wood fiber product and 8% resins. Particleboard is composed of wood fiber product and sawdust. Such products are also used in furniture, shelving, countertop substrates, etc. Surfacing materials may cover the surface of the wood fiber product substrate. The surfacing materials may include laminates, veneers, foils, acrylics, top coated paper, melamine and thermal fused melamine and others, such as some type of coating or paint. These surfacing materials may cover the substrate surface, thereby converting the engineered wood products to a final finished product such as a bookshelf, desk or kitchen countertop. Laminates are synthetic materials typically made up of several layers of multiple sheets of brown paper, a decorative paper and a melamine or plastic-type coating. Of course, there are many other constructions and materials used in the production of laminates. For example, laminates for flooring typically are formed of several layers. The top wear layer is cellulose paper impregnated with clear melamine resins. Below this layer is the decorative layer—a photo or pattern printed on paper and strengthened with resins. The core is usually a durable fiberboard type wood fiber product. Other such products are composed of mainly wood fiber product and wood fiber product recycled and recovered products with resins and/or glues to hold the wood fiber product together.

Finished products with different graphics and patterns, can be used for example, to simulate granite or wood grain structures. These effects may be obtained by manufacturers using laminates with decorative paper with a pattern printed on the paper. This may provide a more interesting effect as compared with a solid color printed paper, and other surfacing materials. An objective of this kind of finishing is to provide more attractive design surfaces to compete with granite and wood, yet offer a significantly reduced price. Whereas granite countertops may cost between $70-$100 a square foot, laminate countertops generally cost between $5-$20 a square foot.

However, a basic problem inherent in patterned laminates is that the patterns or graphics indeed look like they were "painted-on". Typical materials do not look like a part of the laminate surface or texture. It is often the reaction of consumers that such patterned laminates appear cheap and look cheap. No one is fooled to believe that a paper-patterned wood grain laminate is really wood or a paper-patterned granite laminate is really granite.

Cheaper materials may provide even poorer quality. Top coated papers, for example, may produce a relatively poor quality surface image. Melamine surfacing materials often require the melamine to be glued on both the top and bottom of the wood composite board to insure satisfactory structural integrity. Veneers produce an attractive wood grain appearance, but cause a marked increase in cost of the finished product.

Current design options limit the application and share of the market laminates hold in both the residential and commercial market sectors.

SUMMARY

An aspect describes using a laser to scribe graphics, logos and patterns directly on engineered wood fiber product substrates. Exemplary materials may include MDF, particleboard, and other wood fiber products. The embodiments described herein contemplate use of a substrate formed of wood fiber product. The term wood fiber product is used herein to refer to any pieces of wood, such as wood chunks, wood pulp, sawdust, or any other wood fiber product, that is compressed and held together, by glue or some other comparable substance. The substrate may have its surface formed of the substrate material, as in the case of uncoated MDF, or may have a coating of some type on its surface.

An embodiment uses a laser beam to contact the surface of an engineered wood fiber product material alters the physical and/or chemical and/or surface properties of the material to scribe a graphic, logo or pattern. A laser beam can interact with a surface in a number of ways to change the surface properties, including light absorption, photon scattering and impact. For example, a surface may be burned by an intense laser beam. Some surface particles may be ablated from a surface by the impact of a laser beam. This removal from the surface makes the product look more like a real piece of wood when the graphic pattern lazed is a wood grain pattern, which has some surface variations caused by the wood grain. In an embodiment, adding depth or texture to the applied image can increase the realism of the scribed image.

Embodiments describe how one or more surfaces can be treated with one or more lasers at specified power levels, speeds and other controlled parameters, to achieve certain effects that are much less cost and higher quality than conventional methods or may not even be feasible with other techniques.

DETAILED DESCRIPTION

The authors have noticed the absence of any teaching in the art regarding laser scribing of graphic images and patterns directly on wood fiber product surfaces, and engineered wood fiber products. The authors believe this is because there are conflicts between the size of the part that needs to be lazed, the resolution required to obtain the graphic quality, and the exceptionally high laser power required. The larger the part to be processed, the larger the laser beam size, the poorer the resolution and the higher the laser power required to etch the pattern on the wood fiber product.

An embodiment describes using a laser to form wood grain patterns on wood fiber products, e.g., medium density wood fiber products (MDF) with large sizes, for example 24-96 inches in width or length. Optics may be used which increase the size of the laser beam in proportion to the field size of the lazing. However, these optics will decrease the resolution or image quality. For instance, laser etchings with a laser that is fitted with optics for a square eight inch bed will have much finer resolution and detail, as compared with laser etchings with a laser that is fitted with optics for a square 60 inch bed. The farther the laser is from the material, the larger the beam size. Hence, in order to laser etch MDF products that are, for example, 60 inches in one direction, using this arrangement, requires a laser field size that is 60 inch square and a corresponding larger beam diameter. Even larger field sizes with corresponding larger laser beam diameters are required to laser etch products, such as MDF or laminate products that are larger. As the laser beam diameter increases, the resolution of the graphic and the fineness of the detail of the graphics decrease and the laser power required to etch patterns on MDF are great, i.e from 1,000-2,500 watts. Hence, the inventors noticed the difficulty to obtain fine detail laser etchings when using this embodiment for processing materials of fairly large size.

The present application describes: 1) the control of the laser operating parameters which influence EDPUT (energy density per unit time) for lazing graphics, patterns and logos on engineered wood fiber products for all sizes, and 2). a new method to process engineered wood fiber products that are from 4 feet to 12 feet in width or length.

EDPUT, or energy density per unit time, is a parameter that defines the amount of power that is applied to a certain area in any unit time. The EDPUT may be expressed in watts-sec/mm$^3$ or other analogous units which express continuous laser power (watts) divided by the speed of movement of the laser spot (mm$^3$/s). The EDPUT can be controlled by control of laser power, duty cycle, or speed of the laser relative to the work piece for a given power, or by other parameters, and a combination of parameters. A range of EDPUT is determined for scribing a desired graphic on a given material which results in a specified change. The EDPUT can be controlled to stay within that range to achieve desired results in a repeatable fashion—that is, the EDPUT is found for one work piece of specified material, and can be used repeatedly on other work pieces of other similar materials. The EDPUT can also be controlled by setting a speed of the material relative to the laser, for a given laser power, that will result in a perceivable change for a given laser power. In this sense, the EDPUT is a formulaic way of expressing the amount of energy that is applied to any area of the material, in any time. This amount of energy causes the perceivable change. The perceivable change is caused by application of a specified amount of power to the material, that will result in a perceivable change being formed to the material. For any fixed power, the change can be controlled by a threshold speed of laser movement relative to the work piece, which results in controlling the amount of power that is applied to the work piece per unit area and per unit time. Importantly, the controlled EDPUT or controlled speed prevents undesired effects such as burns, melts or deformation, but still allows a perceivable change to the material surface. However, the EDPUT must be high enough to cause that perceivable change to the surface.

An embodiment relates to a method of scribing graphics, logos and patterns on different engineered wood fiber products commonly used in residential and commercial countertops, bathroom fixtures, walls, trade show displays, flooring, furniture, etc. In this embodiment, the EDPUT can be controlled to substantially avoid undesirable defects, melting, charring or burn-through. However, the EDPUT may remove a portion of the surface material, to form a surface relief, causing the surface to vary in height, much like the grains on a real piece of wood. According to one embodiment, the pattern which is used to control the etching, has different portions which are intended to be etched at different amounts of applied energy to produce an effect where some parts of the pattern are more deeply etched into the material than other parts. The different parts may be etched at different EDPUTs, for example. The output includes information to etch the different portions by the different amounts. This, in effect, adds information for a third dimension to the pattern, where the third dimension is the depth of the pattern.

Further, the embodiment discloses specific laser configurations which for the first time will allow the laser etching on wood fiber product parts 4-12 feet in length, or even more. Thus, the embodiment can overcome the technical barriers which limited lasers to writing only on areas within their own defined active area. Another embodiment enlarges the field size without correspondingly losing resolution in the lazed pattern.

The laser operating parameters that influence EDPUT may include any or all of the continuous power of the laser beam, the area of the spot formed by the laser beam on the material, and the speed of the laser beam relative to the surface of the material.

The inventors also noticed that the frequency of the laser will have an impact on the desired EDPUT as well. Frequency is described as the number of laser pulses per second. Depending upon the speed of the laser, a low frequency will create a stitching effect or a dotted line, whereas a higher frequency will create a solid line. These parameters each and in an interactive manner influence the desired EDPUT. The EDPUT forms the critical factor to eliminate melting, burn-through and/or undesirable defects on the surface of the engineered wood fiber products and surfacing materials, yet still produce a visible graphic, logo or pattern on the material. If the EDPUT is too high, the laser can burn through or melt either whole material or create defects. Conversely, if the EDPUT is too low, the graphic scribed onto the material will not be sufficiently visible.

It was found that the EDPUT was different for different types of materials, and was often different for different colors and weights of material. Further, it was found that the EDPUT was often different for different types and sizes of graphics scribed onto the material. This disclosure teaches the importance of identifying and simultaneously controlling several laser operating parameters together so as to achieve an EDPUT which produces the desired results on engineered wood fiber products each and every time.

The authors believe that a totally new aesthetic is realized by providing patterns or graphics on engineered wood fiber products in a new novel manner by laser-etching the patterns directly on the surface of the material. An aspect relates to a unique laser-etching method of scribing a graphic, logo or pattern on engineered wood fiber products where a laser beam contacts the surface of the material, and alters the physical and/or chemical properties and/or surface properties of the material to etch a graphic on the surface. The laser beam is directed at the material through a series of mirrors (galvo driven system), or shutters or lens systems. There are primarily two principle methods to drive a laser beam. The first one is to drive the laser beam with a linear motor or XY table. This method is common in the laser cutting industry which uses 1,000-10,000 watt lasers to cut steel for example. The linear motor or XY table travels exceptionally slow and would not be a practical or economical method to laze graphic patterns on wood fiber products or laminates. The second method to drive a laser beam onto a material is with galvo mirrors as described in FIG. 1. This method finds wide application in the laser engraving of plastic and steel bearings. However, galvo driven lasers in this segment of the industry are usually limited to relatively small field sizes (less then about 20-30 inches) and power levels less than 500 watts. Similarly, this method would not be practical or economical to laze graphic images on wood fiber products and would not even be possible for larger sizes. The authors noted that laser powers from 1,000-2,500 watts would be required to laze wood grain patterns on wood grain products with nominal sizes of 48 inch square, even at relatively slow scan speeds of 10 meters/second. In order to provide a laser system with 1,000-2,500 watts that is galvo driven, special lightweight mirrors with high temperature coatings must be provided in order for the galvos to move the laser beam in a repeatable fashion. Hence, the authors have identified a new laser industry segment— high powered lasers that are galvo driven to process parts that are 4 feet or greater in width or length. The present specification, for the first time, defines formations of new patterns and graphics on engineered wood fiber products and new processes for generating said patterns. These new patterns and graphics are defined in detail herein, but more specifically include areas of selectively etched engineered wood fiber products and areas of non-selectively etched engineered wood fiber products.

The authors realized, however, that no matter how attractive this new aesthetic was on laser-etched engineered wood fiber products, an economical production process must be invented using the laser process. One barrier to overcome was inventing a new laser etching method to process the typical sizes of engineered wood fiber products sheet goods, i.e. widths of 3, 4 or 5 feet with lengths of 8, 10 or 12 feet. But the authors were not aware of any laser optics which could process 8-12 foot lengths of sheet goods using a typical galvo-driven laser system. Usually the field size common to laser etching machines are 8 inch square to 30 inch square. Embodiments to process 12 foot materials with a laser etching process while providing sufficiently high resolution to generate an attractive detailed graphic pattern are described herein.

A first embodiment operates to further increase the field size of the laser system and corresponding height of the laser from the work piece so that 12 foot lengths is processed with one very high powered laser and optics which allow scanning the laser beam along a 12 foot length. The engineered wood fiber products are stationed on a standard conveyor or shuttle system and indexed into position for lazing. Very high laser powers of at least 1,000 watts and preferably 2,500 watts or more would be required with a special mirror system to handle the high laser beam power.

This embodiment increases the beam size, and this beam size may limit the resolution of the graphics that can be lazed on the product. However, heavier mirror systems and different lens systems can be used to reduce the beam size to some degree and provide an acceptable level of resolution. This technique however can offer only minor improvements in the resolution.

Another embodiment uses more than one laser, e.g., twin lasers, each of which have smaller field sizes and processes different lengths of the engineered wood fiber products. The lasers are programmed to produce a substantially perfect pattern seam between the areas where the lasers mark on the material. The resolution is improved with this embodiment, due to the smaller laser beam size. An alternative of this embodiment may use multiple lasers to produce graphics with even finer line widths. Each laser can process an area less than six feet long. This forms another embodiment. The multiple lasers are closer to the table, thus producing a finer laser beam. Very high resolution graphic patterns with high detail can be lazed on the surface of the material with this concept.

Another embodiment uses one laser beam with a beam splitter so that each beam processes a larger length of the wood fiber product.

Another embodiment moves the four-twelve foot laminate along a conveyor system and laser-etches the pattern in a continuous print-on-the-fly method with one or more lasers. This configuration also allows high resolution graphics to be lazed on the material in a very economical process.

Another embodiment uses one or more stationary laser beams, and moves the material in an x-y fashion to complete the etching. This method would be very slow however.

Another embodiment provides the laser with the optics necessary first to achieve the required graphic resolution. Then, the laser scan head is moved in a linear direction with a linear motor or other movement device, to laze section by section of the work piece. This allows any resolution to be obtained and any work piece to be lazed no matter what the size of the part or the graphic resolution required. For example, if a graphic with a resolution compatible with a laser field size of 24 inches was desired to be etched on a 24 inch by 96 inch part, it would be difficult or impossible to obtain with the current technology. However, with this technique, the laser with a field size of 24 inches processes the first section 24 inches in length. Then the scan head moves to the end of the first section so that the second section is lazed from 24 inches to 48 inches in length. Of course, the movement of the scan head, may in reality be simply the movement of a movable mirror that is associated with the scan head, in any of these embodiments. Then the scan head moves so the third section is lazed from 48 inches to 72 inches in length. Finally, the scan head moves again so that the final section is lazed from 72 inches to 96 inches in length.

In order to process this 24 inch by 96 inch part with conventional technology, a laser with a 96 inch field size would be required with a very large laser beam diameter and associated poor resolution. Further, the laser power required would be several thousand watts to provide an acceptable image on the surface of the wood fiber product since the wider beam significantly reduces EDPUT for a given power level.

However, with this new disclosed linear motor technique, the part can be lazed with a fine laser beam and resolution associated with a field size of 24 inches versus 96 inches with a lowered watt laser. The laser scan head can be made to move in both the x and y directions so that any size part with even the smallest laser beam diameters associated with the highest graphic resolution can be processed. So, for example, if the work piece is 60 inches square and the graphic resolution requires a laser field size of 20 inches square, this technique allows this part to be processed simply by laser etching the high resolution graphic in nine sections. The scan head must be controlled to have a precision of the laser beam which is at least as great as that of the other lasing. In this way, there will not be any line of demarcation between the sections and the part will look as if it were lazed in one 60 inch by 60 inch section.

Another embodiment provides the laser with a movable z axis such that the laser optics change beam size and resolution as the laser is moved closer or farther to the work piece in the z direction.

Figure 1:
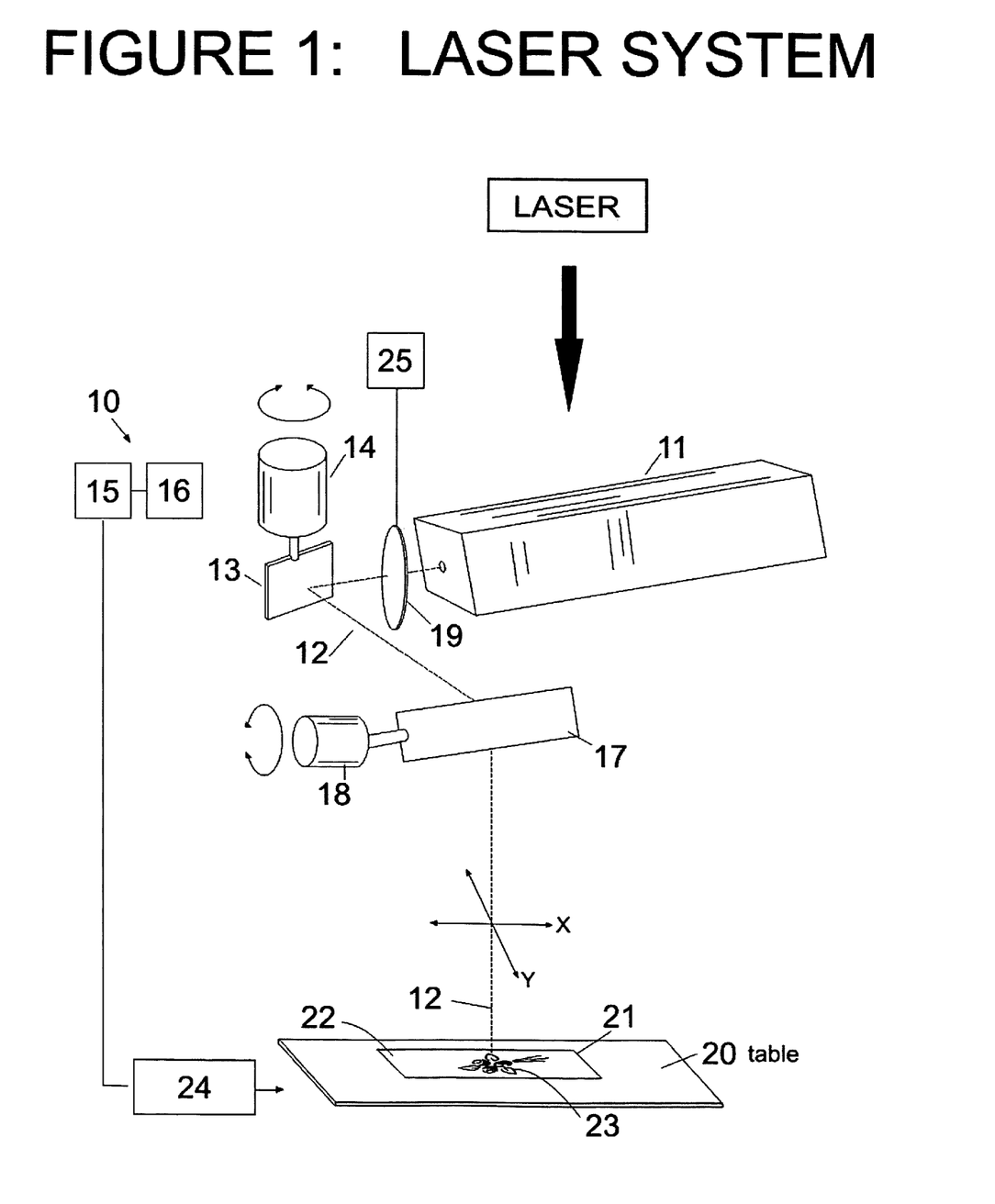
FIG. 1 is a schematic view of an embodiment of a laser method of forming graphics on engineered wood fiber product products in order to process such parts that have lengths of 2-12 feet in length in accordance with an embodiment.

FIG. 1 illustrates a laser method of scribing graphics on materials. The method utilizes the apparatus indicated generally at 10. The apparatus includes a laser 11 which can be adjusted by the numerical control computer 15 for different power outputs. A laser may be a Laser-Sharp® laser system from LasX Industries in White Bear Lake, Minn.

The laser 11 generates a laser beam 12 in the direction of a computer numerically controlled mirror system. The laser beam 12 first passes through a focusing lens assembly there usually one lens 19 moves coaxially with the beam path to maintain focus on material 21. Linear motor 25 positions the lens 19 in response to numerical control computer 15 controlling the output to power source 16 to control the linear position of linear motor 25. The focusing laser beam 12 then passes through a mirror system that first includes an x-axis mirror 13. The x-axis mirror 13 is mounted on an x-axis galvanometer 14. The x-axis galvanometer 14 is adapted to rotate to cause rotation of the x-axis mirror 13. Rotation of the x-axis mirror 13 causes movement of the laser beam 12 along the x-axis. A numerical control computer 15 controls the output of a power source 16 to control rotation of the x-axis galvanometer. The focusing laser beam 12 is deflected by the x-axis mirror 13 and directed toward a y-axis mirror 17. The y-axis mirror 17 is mounted on a y-axis galvanometer 18. The y-axis galvanometer 18 is adapted to rotate to cause rotation of the y-axis mirror 17. Rotation of the y-axis mirror 17 causes movement of the focusing laser beam 12 along the y-axis. The numerical control computer 15 controls the output of the power source 16 to control rotation of the y-axis galvanometer 18. The lens 19, linear motor 25, mirrors 13, 17 and galvanometers 14, 18 can be housed in an assembly called a scan head of a laser.

The apparatus 10 further includes a working plane 20 which can be almost any solid substrate such as a conveyor, a table, or even a gaseous fluidized bed. A material 21 is placed on the working plane 20. The material 21 includes a surface 22. The working plane 20 or laser 11 can be adjusted vertically to adjust the distance from the lens 19 to the surface 22 of the material 21. The laser beam 12 is directed by the mirrors 13, 17 against the surface 22 of the material 21. Usually the laser beam 12 is directed generally perpendicular to the surface 22, but different graphics can be achieved by adjusting the angle between the laser beam and the surface from about 0 degree to about 20 degrees measured from the vertical. Movement of the laser beam 12 in contact with the surface 22 of the material 21 causes a graphic 23 to be scribed on the surface 22. The movements and timing of the mirrors 13, 17 are controlled by the numerical control computer 15 to scribe the specific desired graphic 23.

A second computer such as a workstation computer can be used to control and facilitate the formation of the desired graphic. For example, a graphic can be scanned into the workstation computer, converted into a useable format such as a bitmap, and then introduced into the numerical control computer via floppy disk or network. The numerical control computer 15 then controls the laser 11, linear motor 25, and galvanometers 14, 18 to form the graphic on the surface of the material at the appropriate EDPUT. In the embodiment, the EDPUT that is used is either selected from a pre-stored table, or calculated, or simply set, to a value that changes the look of the material without burning or melting the material, and by an amount that changes the surface profile of the material.

The apparatus 10 can also include a tank 24 to inject a gas such as an inert gas into the working zone. The amount of gas can be controlled by the numerical control computer 15 or by other means.

Figure 5:
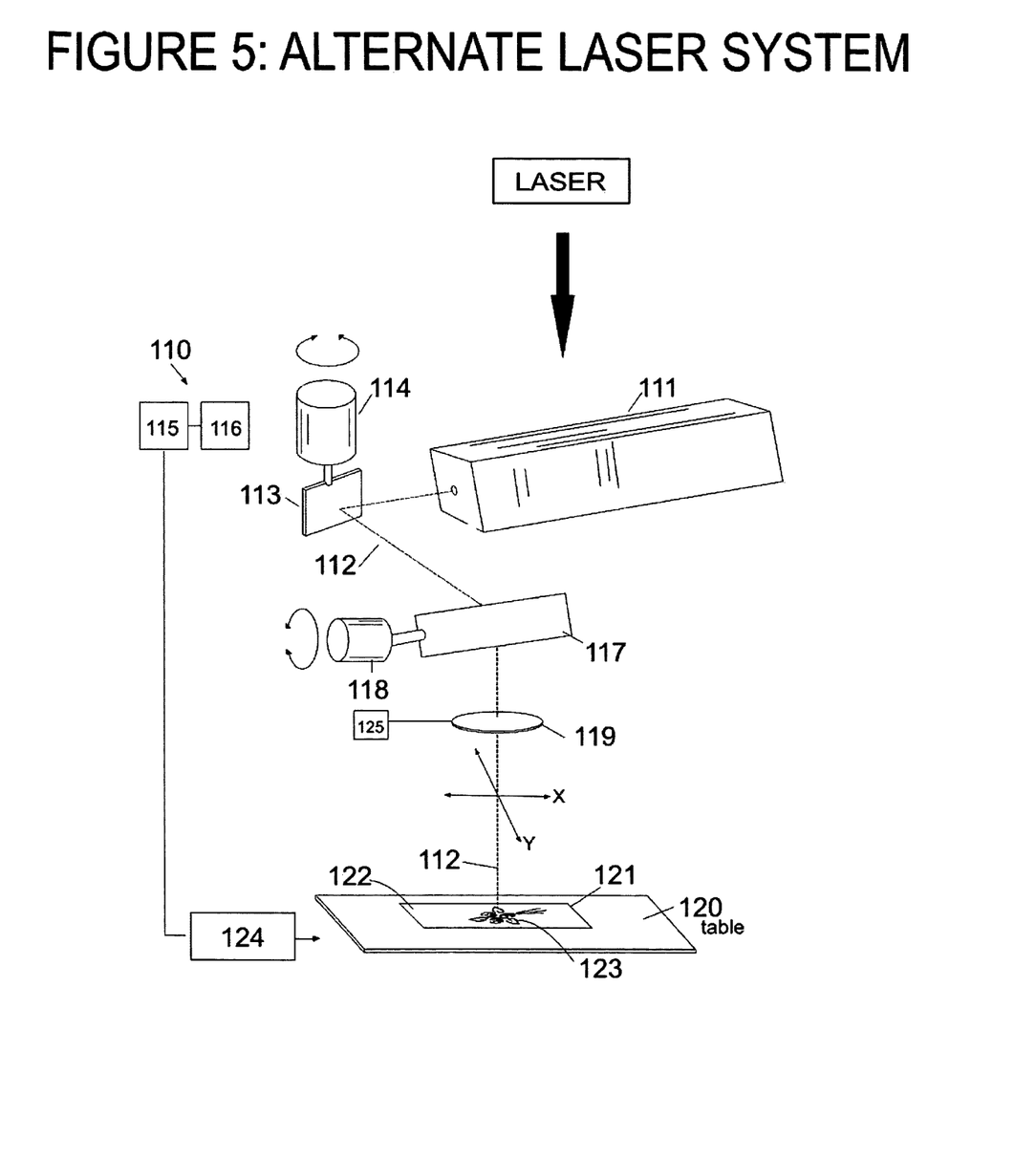
FIG. 5 is a schematic view of another embodiment of a laser method of forming graphics on engineered wood fiber products using one or more lasers with a different location of the lens located immediately following the mirrors.

An alternative method of scribing graphics on materials in accordance with this embodiment is shown in FIG. 5. With this embodiment, laser beam 112 can be first deflected by x-axis mirror 113 and y-axis mirror 117, and then directed through stationary focusing lens 119. Lens 119 is adapted to focus laser beam 112.

Figure 2:
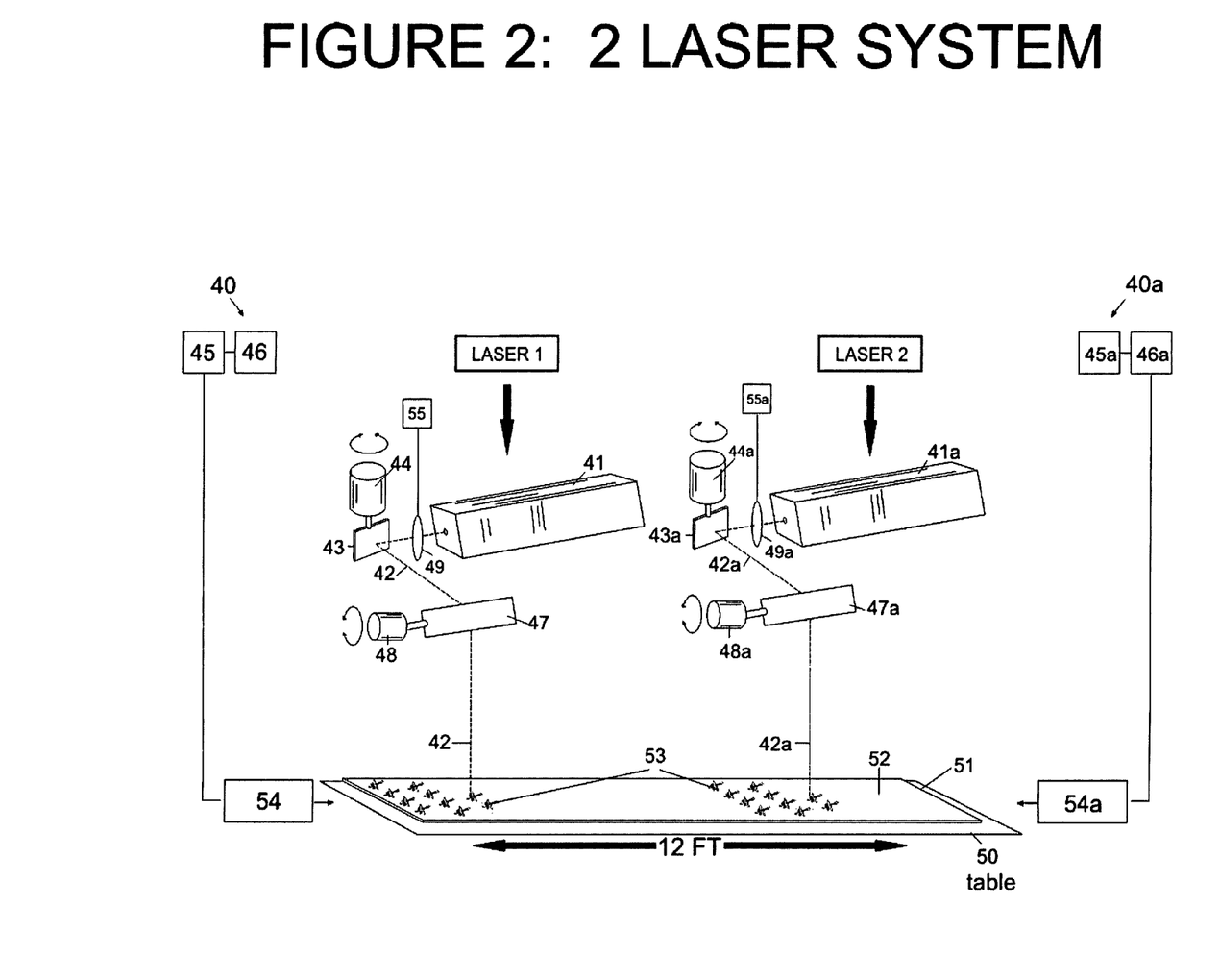
FIG. 2 is a schematic view of another embodiment of a laser method of forming graphics on engineered wood fiber products using two lasers processing six foot sections of the part.

FIG. 2 illustrates another method of scribing graphics on materials using two or more lasers in accordance with this embodiment. The method utilizes the apparatus' indicated generally at 40 and 40a. The apparatuses include lasers 41 and 41a which can be adjusted by the numerical control computers 45 and 45a for different power outputs. A 2-Laser system is a Laser-Sharp® laser system from LasX Industries in White Bear Lake, Minn.

Lasers 41 and 41a generate laser beams 42 and 42a in the direction of a computer numerically controlled mirror system. Laser beams 42 and 42a first pass through a focusing lens assembly where usually lens' 49 and 49a move coaxially with the beam paths to maintain focus on material 51. Linear motors 55 and 55a position lens 49 and 49a in response to numerical control computers 45 and 45a controlling the output to power sources 46 and 46a to control the linear position of linear motors 55 and 55a. The focusing laser beams 42 and 42a then pass through a mirror system that first includes x-axis mirrors 43 and 43a. The x-axis mirrors 43 and 43a are mounted on x-axis galvanometers 44 and 44a. The x-axis galvanometers 44 and 44a are adapted to rotate to cause rotation of the x-axis mirrors 43 and 43a. Rotation of the x-axis mirrors 43 and 43a causes movement of laser beams 42 and 42a along the x-axis. Numerical control computers 45 and 45a control the output of power sources 46 and 46a to control rotation of the x-axis galvanometers. The focusing laser beams 42 and 42a are deflected by the x-axis mirrors 43 and 43a and directed toward the y-axis mirrors 47 and 47a. The y-axis mirrors 47 and 47a are mounted on y-axis galvanometers 48 and 48a. The y-axis galvanometers 48 and 48a are adapted to rotate to cause rotation of the y-axis mirrors 47 and 47a. Rotation of the y-axis mirrors 47 and 47a causes movement of focusing laser beams 42 and 42a along the y-axis. Numerical control computers 45 and 45a control the output of power sources 46 and 46a to control rotation of y-axis galvanometers 48 and 48a. Lens' 49 and 49a, linear motors 55 and 55a, mirrors 43, 43a, 47, 47a and galvanometers 44, 44a, 48 and 48a can be housed in an assembly called a scan head (not shown).

Apparatus' 40 and 40a further include a working plane 50 which can be almost any solid substrate such as a conveyor, a table, or even a gaseous fluidized bed. A material 51 is placed on the working plane 50. The material 51 includes a surface 52. The working plane 50 can be adjusted vertically to adjust the distance from lens' 49 and 49a to the surface 52 of the material 51. Laser beams 42 and 42a are directed by mirrors 43, 43a, 47 and 47a against the surface 52 of the material 51. Usually, laser beams 42 and 42a are directed generally perpendicular to the surface 52, but different graphics can be achieved by adjusting the angle between the laser beams and the surface from about 0 degrees to about 20 degrees measured from the vertical. Movement of laser beams 42 and 42a in contact with the surface 52 of the material 51 causes a graphic 53 to be scribed on the surface 52. The movements and timing of mirrors 43, 43a, 47 and 47a are controlled by numerical control computers 45 and 45a to scribe the specific desired graphic 53.

Laser 41 and laser 41a laze a certain portion of the laminate such that the seam would be substantially perfect and unnoticeable. For example, laser 41 laze a pattern on the first six feet and laser 41a laze a pattern on the second six feet so that a piece of laminate 4 feet by 12 foot would be patterned perfectly. It also can be seen that more than two lasers is used to process the 3 foot by 12 foot laminate part. For example in a three laser configuration, laser 1 could laze the first 4 feet, laser 2 the second 4 feet and laser 3 the third 4 feet so that the 12 foot part is patterned. A key is to insure that exactly where one laser stops, the second laser continues to etch the graphic or pattern such that there is no seam, or substantially no seam. In one embodiment, the areas between the sections of the pattern have a small gap that is defined between them, where the gap is double the beam size from the laser. This prevents double lasing at the area between the sections. Since the beam size from the laser is very small, any gap between pattern parts will be very small and not noticeable. This also prevents double lasing—which actually could be noticeable at areas between the pattern portions.

The laser scan head can be made to move in both the x and y directions so that any size part with even the smallest laser beam diameters associated with the highest graphic resolution can be processed. So, for example, if the work piece is 60 inches square and its graphic resolution requires a laser field size of 20 inches square, this technique allows this part to be processed simply by laser etching the high resolution graphic in nine sections. Since the increased resolution increases the precision of the laser beam scan head, there will not be any line of demarcation between the sections, and the part will look as if it were lazed in one 60 inch by 60 inch section. More generally, the work piece can be lazed in any number of sections, preferably 2n, where n is 0, 1, 2, 3, 4, 5 or 6.

Another major benefit of this technique, is that much higher energy densities are associated with fine laser beams, so that the cycle time to process parts may be improved.

A second computer such as a workstation computer can be used to facilitate the formation of the desired graphic. For example, a graphic can be scanned into the workstation computer, converted into the proper format, and then introduced into the numerical control computer via floppy disk or network. Numerical control computers 45 and 45a then control lasers 41 and 41a, linear motors 55 and 55a, and galvanometers 44, 44a, 48 and 48a, to form the graphic on the surface of the material at the appropriate EDPUT.

Apparatus' 40 and 40a can also include tanks 54 and 54a to inject a gas such as an inert gas into the working zone. The amount of gas can be controlled by numerical control computers 45 and 45a or by other means.

An alternative method of scribing graphics on materials in accordance with this technique is similar to that in FIG. 5. With this method, laser beams 42 and 42a can be first deflected by x-axis mirrors 43 and 43a and y-axis mirrors 47 and 47a, and then directed through stationary focusing lens' 49 and 49a. Lens' 49 and 49a are adapted to focus laser beams 42 and 42a. Preferably, lens' 49 and 49a are a multi-element flat-fielded focusing lens assembly, which optically maintains the focused spot on a flat plane as the laser beam moves across the material to scribe a graphic.

Figure 3:
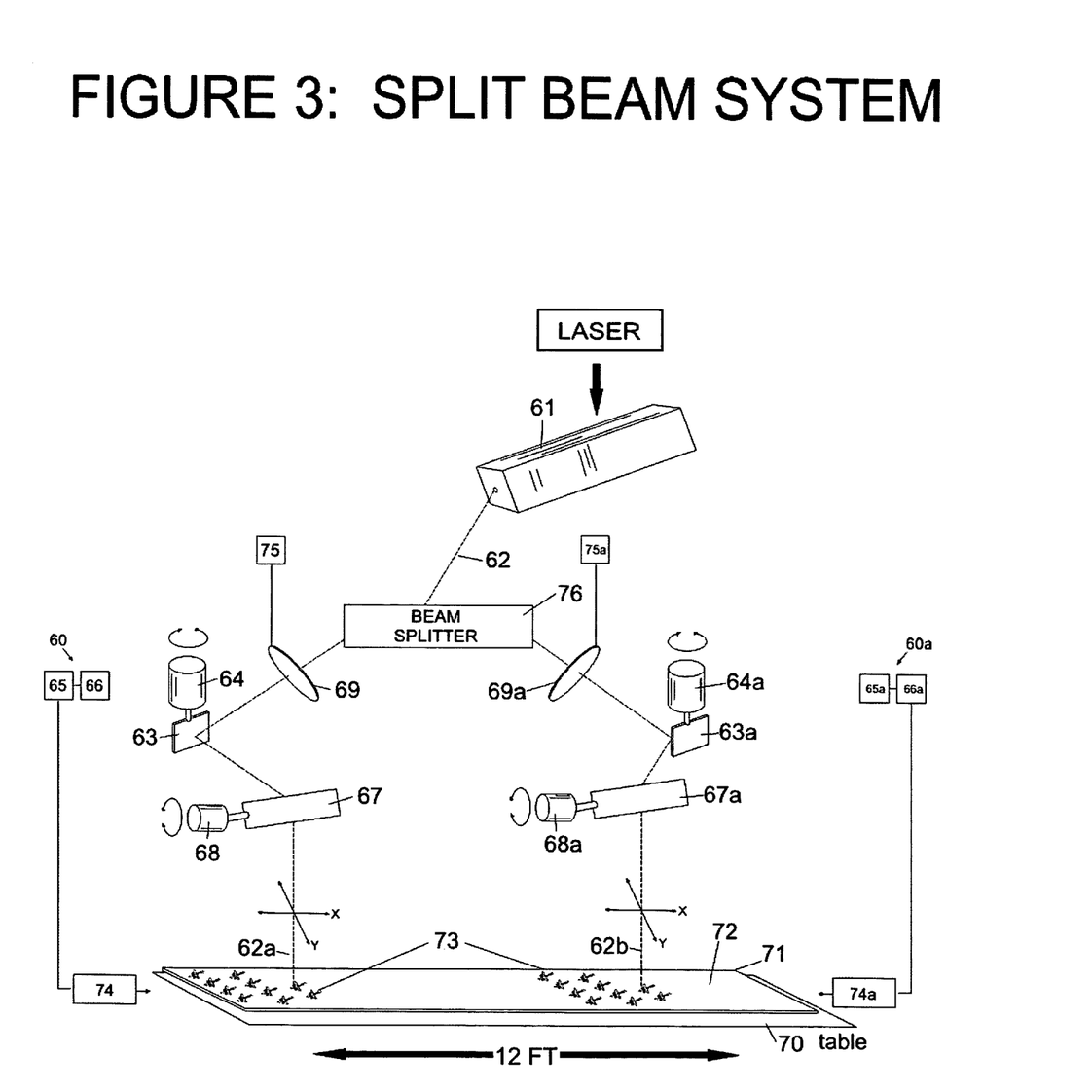
FIG. 3 is a schematic view of another embodiment of a laser method of forming graphics on engineered wood fiber products using lasers with a beam splitter with each beam processing six foot sections of the part.

FIG. 3 illustrates a split beam laser method of scribing graphics on materials. The method utilizes the apparatus' indicated generally at 60 and 60a. The apparatus' include laser 61 which can be adjusted by the numerical control computers 65 and 65a for different power outputs. A split beam system is a Laser-Sharp® laser system from LasX Industries in White Bear Lake, Minn.

Laser 61 generates laser beam 62. Beam Splitter 76 converts laser beam 62 to laser beams 62a and 62b in the direction of a computer numerically controlled mirror system. Laser beams 62a and 62b first pass through a focusing lens assembly where usually lens' 69 and 69a move coaxially with the beam paths to maintain focus on material 71. Linear motors 75 and 75a positions lens 69 and 69a in response to numerical control computers 65 and 65a controlling the output to power sources 66 and 66a to control the linear position of linear motors 75 and 75a. The focusing laser beams 62a and 62b then pass through a mirror system that first includes x-axis mirrors 63 and 63a. The x-axis mirrors 63 and 63a are mounted on x-axis galvanometers 64 and 64a. The x-axis galvanometers 64 and 64a are adapted to rotate to cause rotation of the x-axis mirrors 63 and 63a. Rotation of the x-axis mirrors 63 and 63a causes movement of laser beams 62a and 62b along the x-axis. Numerical control computers 65 and 65a control the output of power sources 66 and 66a to control rotation of the x-axis galvanometers 64 and 64a. The focusing laser beams 62a and 62b are deflected by the x-axis mirrors 63 and 63a and directed toward the y-axis mirrors 67 and 67a. The y-axis mirrors 67 and 67a are mounted on y-axis galvanometers 68 and 68a. The y-axis galvanometers 68 and 68a are adapted to rotate to cause rotation of the y-axis mirrors 67 and 67a. Rotation of the y-axis mirrors 67 and 67a causes movement of focusing laser beams 62a and 62b along the y-axis. Numerical control computers 65 and 65a control the output of power sources 66 and 66a to control rotation of y-axis galvanometers 68 and 68a. Lens' 69 and 69a, linear motors 75 and 75a, mirrors 63, 63a, 67, 67a and galvanometers 64, 64a, 68 and 68a can be housed in an assembly called a scan head (not shown).

Parts 60 and 60a further include a working plane 70 which can be almost any solid substrate such as a conveyor, a table, or even a gaseous fluidized bed. A material 71 is placed on the working plane 70. The material 71 includes a surface 72. The working plane 70 can be adjusted vertically to adjust the distance from lens' 69 and 69a to the surface 72 of the material 71. Laser beams 62a and 62b are directed by mirrors 63, 63a, 67 and 67a against the surface 72 of the material 71. Usually, laser beams 62a and 62b are directed generally perpendicular to the surface 72, but different graphics can be achieved by adjusting the angle between the laser beams and the surface from about 0 degrees to about 20 degrees measured from the vertical. Movement of laser beams 62a and 62b in contact with the surface 72 of the material 71 causes a graphic 73 to be scribed on the surface 72. The movements and timing of mirrors 63, 63a, 67 and 67a are controlled by numerical control computers 65 and 65a to scribe the specific desired graphic 73. Each laser beam processes a certain area just as described in the two laser system shown in FIG. 2 such that a perfect seam is achieved. Also, the original laser beam is split into more than two subsidiary laser beams to process the 12 foot laminate part.

A second computer such as a workstation computer can be used in the method to facilitate the formation of the desired graphic. For example, a graphic can be scanned into the work station computer, converted into the proper format, and then introduced into the numerical control computer via floppy disk or network. Numerical control computers 65 and 65a then control laser 61, linear motors 75 and 75a, and galvanometers 64, 64a, 68 and 68a, to form the graphic on the surface of the material at the appropriate EDPUT.

Apparatuses 60 and 60a can also include tanks 74 and 74a to inject a gas such as an inert gas into the working zone. The amount of gas can be controlled by numerical control computers 65 and 65a or by other means.

Alternatively, laser beams 62a and 62b can be first deflected by x-axis mirrors 63 and 63a and y-axis mirrors 67 and 67a, and then directed through stationary focusing lens' 69 and 69a as shown in FIG. 5 with a single laser system. Lens' 69 and 69a are adapted to focus laser beams 62a and 62b.

Figure 4:
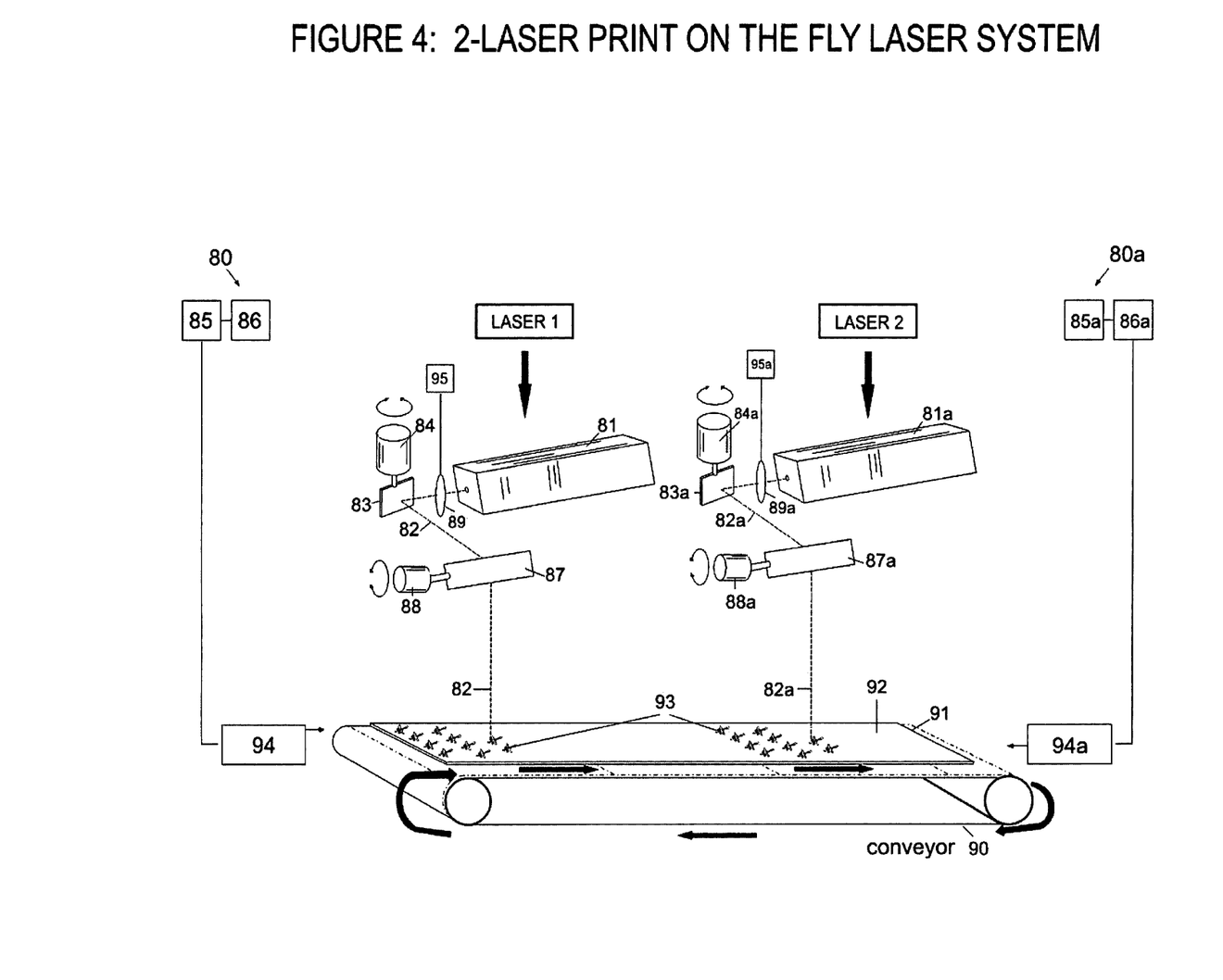
FIG. 4 is a schematic view of another embodiment of a laser method of forming graphics on engineered wood fiber products using one or two lasers to "print-on-the-fly" in a continuous lazing process.

FIG. 4 shows a method of scribing graphics on materials in accordance with this embodiment of a Print on the Fly continuous lazing process. The method utilizes the apparatuses indicated generally at 80. The apparatus' include laser 81 which can be adjusted by the numerical control computer 85 for different power outputs.

Laser 81 generates laser beam 82 in the direction of a computer numerically controlled mirror system. Laser beam 82 first pass through a focusing lens assembly where usually lens 89 move coaxially with the beam paths to maintain focus on material 91. Linear motor 95 positions lens 89 in response to numerical control computers 85 controlling the output to power source 86 to control the linear position of linear motor 95. The focusing laser beams 82 then pass through a mirror system that first includes x-axis mirror 83. The x-axis mirror 83 is mounted on x-axis galvanometer 84. The x-axis galvanometer 84 is adapted to rotate to cause rotation of the x-axis mirror 83. Rotation of the x-axis mirror 83 causes movement of laser beam 82 along the x-axis. Numerical control computer 85 control the output of power source 86 to control rotation of the x-axis galvanometers. The focusing laser beam 82 is deflected by the x-axis mirror 83 and directed toward the y-axis mirror 87. The y-axis mirror 87 is mounted on y-axis galvanometer 88. The y-axis galvanometer 88 is adapted to rotate to cause rotation of the y-axis mirror 87. Rotation of the y-axis mirror 87 causes movement of focusing laser beam 82 along the y-axis. Numerical control computer 85 control the output of power source 86 to control rotation of y-axis galvanometer 88. Lens 89, linear motor 95, mirrors 83 and 87 and galvanometer 84 and 88 can be housed in a scan head assembly.

Apparatus 80 further includes a working plane 90, a conveyor system or some type of system that moves the material 91 while the laser 81 is processing. A material 91 is placed on the working plane 90. The material 91 includes a surface 92. The working plane 90 can be adjusted vertically to adjust the distance from lens 89 to the surface 92 of the material 91. Laser beam 82 is directed by mirrors 83 and 87 against the surface 92 of the material 91. Usually, laser beam 82 is directed generally perpendicular to the surface 92, but different graphics can be achieved by adjusting the angle between the laser beam and the surface from about 0 degrees to about 20 degrees measured from the vertical. Movement of laser beam 82 in contact with the surface 92 of the material 91 causes a graphic 93 to be scribed on the surface 92. The movements and timing of mirrors 83 and 87 are controlled by numerical control computer 85 to scribe the specific desired graphic 93.

To continuously print on the fly, the speed of the laser beam 82 and the movement of the working plane 90 must be in sync. A tracking wheel or optical system is used to coordinate between the two. As the working plane 90 moves in a horizontal direction, the laser beam 82 is traveling in either a horizontal or vertical direction along the material 91 to create the specified graphic 93. If the working plane slows down, the tracking wheel relays that change to the laser for it to make the necessary adjustments. The speed of the laser beam 82 for that particular graphic 93 determines the movement of the working plane 90. Movement of the laser beam 82 in contact with the moving working plane 90 of the material 91 causes a graphic 93 to be formed on the surface 92. The movements and timing of the laser 81 and the moving working plane 90 are coordinated to form the specific desired graphic 93 and to control the EDPUT within a predetermined range.

A second computer such as a workstation computer can be used in the method to facilitate the formation of the desired graphic. For example, a graphic can be scanned into the work station computer, converted into the proper format, and then introduced into the numerical control computer via floppy disk or network. Numerical control computer 85 then control laser 81, linear motor 95, and galvanometers 84 and 88, to form the graphic on the surface of the material at the appropriate EDPUT.

Apparatus 80 can also include tank 94 to inject a gas such as an inert gas into the working zone. The amount of gas can be controlled by numerical control computers 85 or by other means.

Alternatively, laser beam 82 can be first deflected by x-axis mirror 83 and y-axis mirror 87, and then directed through stationary focusing lens 89 as shown in FIG. 5 with a single laser system. Lens 89 is adapted to focus laser beam 82.

The range of laser parameters which influence EDPUT that is used to etch graphics, logos and patterns on wood fiber products is shown below:
Continuous power: 1,000-5,000 watts
Focused Laser Spot Diameter: 0.2-3.0 mm
Speed: 1-60 m/sec
Frequency: 0-100 kHz The range of EDPUT for these parameters is then calculated to be from 0.0024 watts-sec/mm$^3$ to 159.24 watts-sec/mm$^3$.

watts-sec/mm2 to 25.47771 watts-sec/mm$^2$.

In a series of experiments, graphics, logos and patterns were formed on different engineered wood fiber product and surfacing materials using the laser apparatus and method illustrated in FIG. 1. The operating parameters were maintained within the following ranges:
Continuous power: 2,500 watts
Focused Laser Spot Diameter: 0.5-2.5 mm
Speed: 5-60 m/sec
Frequency: 10-40 kHz This range of operating parameters produces a range of EDPUT from 0.0085 watts-sec/mm$^3$ to 2.55 watts-sec/mm$^3$.

The "continuous power" is the continuous power output of the laser, as distinguished from the power output when the laser has a temporary energy surge, or when the laser is pulsed. The continuous power can be varied by adjusting the power setting on the laser. However, the laser power may be adjusted during the operation, and the continuous power does not need to be continuous over time.

The "area of spot" is the area of the spot formed by the laser beam on the surface of the material when the laser beam is stationary relative to the material. The area of the spot formed when the laser beam is in focus is a characteristic of the laser and the lens. When the laser beam is in focus, the distance from the laser to the surface will determine the spot size. However, if it is desired within the graphic, it is possible to defocus the beam, which will enlarge the beam size and lower the EDPUT.

The "speed" is the speed of the laser beam relative to the surface of the material. The speed can be varied by controlling the movements of the x-axis mirror 13 and y-axis mirror 17 illustrated in FIG. 1. In other embodiments of the embodiment, the speed can be varied by controlling the movements of the laser, the movements of the material, the movements of a lens, by combinations of these methods, or by other means.

Accordingly, this embodiment teaches the use of a variable power laser such that the continuous power can be ratcheted down or up to certain levels. Previous literature typically refers to the use of a laser having a specific power output, for example a 200 watt YAG laser or a 500 watt $CO_2$ laser. In contrast, this embodiment teaches to control the continuous power or duty cycle and other variables simultaneously and within specific limits so that the EDPUT is within a range to produce the desired results. Consequently, although different $CO_2$ lasers from 200 to 2,500 watt were used in experiments relating to this embodiment, the continuous power was controlled such that power levels between 1,000 and 2,500 watts were achievable with only one laser by changing the duty cycle.

The embodiment also teaches how to produce specific grayscale type graphics and patterns on laminates and wood fiber product materials by changing the EDPUT while drawing a line with the laser across the material. This can be accomplished by changing the power, changing the duty cycle, changing the scan speed, changing the distance from the laser to the work piece (changing the spot size by defocusing the laser beam), or changing a combination of these parameters. In another embodiment, the EDPUT is changed "on the fly", that is, in some section of a scan line by the laser, while the laser is scanning. This may provide a different kind of effect.

After conducting a number of initial laser trials, the authors were very surprised to see the effects of laser scribing graphic designs on a variety of different engineered wood fiber product samples. The quality of the lazed wood fiber products was unlike any other graphic design created by conventional laminates and other printing techniques found on wood fiber products. Crisp laser etchings are achieved which clearly looked like the graphic pattern was part of the natural surface of the wood fiber product material and not "printed" on it. Several patterns lazed on the wood fiber product material assumed a surprising three dimensional appearance. The lazed wood fiber products looked so appealing that the authors next experimented with lazing different types of graphics, logos and patterns on different wood fiber product structures with excellent results. The results indicated that laser-etched wood fiber products could even better replicate the look of wood grain, granite or engineered stone, and further provide both raster and vector-based graphic images with crisp clean drawings. Since laser-etched wood fiber products offer so many new design possibilities, the authors believe that new laser-etched wood fiber products could find wider application as wall panels to compete with wall paper, drywall and wood paneling. Current printed laminates cannot compete favorably with wall paper or wood paneling because of the design limitations. The following laser-etched graphics wood fiber products were shown to have remarkable aesthetic character:

1. abstract—non-recognizable forms and layouts consisting of flowing lines, zig-zags and angular shapes
2. botanical—motifs which are realistic representations of herbs, garden plants, etc.
3. border print—a pattern designed to run lengthwise along edge
4. calico—small allover floral designs
5. check—a pattern of squares
6. conversational pattern—designs using recognizable motifs such as cups or toys
7. florals—designs using flowers and can include natural motifs like leaves, seed pods and marine plants
8. herringbone-zig-zags in a stripe layout
9. hound's tooth—a two color check that forms a kind of four pointed star.
10. liberty print—a particular type of small floral print—often using detailed line-work to delineate the motifs
11. motif—a single element or design that can be used again with variations. For example: a flower, a cluster of flowers, an object, a shape.
12. paisley—a stylized teardrop-shaped design originally on shawls
13. plaid—a printed pattern of crossing bands or stripes of color. Usually horizontal and vertical
14. stripes—lines running all in the same direction
15. wall paper patterns—various patterns typically found in wall paper applications
16. logos—text and/or drawings to form a company's identity.
17. wood grain—textures composed of straight lines, curved lines and feathered tones to simulate wood grain including but not limited to walnut, oak, cherry, hickory, birdseye, ash, apple, redwood, and others.
18. stone—textures composed of faint curved and straight lines to simulate natural stone surfaces.
19. granite—specific textures composed of spectacles and curved and straight lines to simulate granite surfaces.

The patterns can repeat in a cyclic arrangement or occur randomly, as in nature. The repeating patterns can be continuous, so that a section of one pattern matches with a corresponding section of another portion of the pattern, allowing the patterns to be used like wallpaper. Any of the wood grain patterns can be randomly generated, drawn, downloaded from a digital file, or scanned from an actual piece of wood. Patterns can be raster-based (scan lines across the laminate in either a vertical or horizontal direction) or vector—based (lines drawn as outlines with or without filled sections) or both. Software programs such as Adobe Photoshop can be used to edit the digital files and standard conversion programs available in the industry can be used to convert the digital files to the language the laser understands for etching the graphic on the material. The graphics above are just a few of the infinite design capabilities this novel laser etching technology can offer on wood fiber products.

Also, individual logos may be applied to a specific position on the surface of the wood fiber product. In fact, the authors conceived of a new embodiment to use the custom logos wood fiber products for a new method of advertising. For example, company logos can be incorporated in wood fiber products that are used in hotel countertops, commercial buildings and airport bathrooms, sporting event interiors, and commercial building walls. Since it is not very expensive to replace such products compared to other forms of advertisement (for example billboards), more companies could afford to advertise their products or services in this novel advertising method. Also, company logos can be easily laser-etched on wood fiber products for the furniture industry and commercial products industry. Logos can be lightly etched, e.g., using a very low EDPUT, so that the logos are only visible under a certain lighting or from a certain angle.

The authors also disclose that laser-etchings can be applied on wood fiber products at different depths. To achieve this, the laser should have a movable z-axis to adjust for thickness to remain in focus, or a table with a controlled vertical movement should be supplied. In addition, the movable z-axis is used to provide graphic images that are somewhat out of focus to achieve different effects. The movable z-axis will also change the spot size, thus allowing a range of different laser line thicknesses. Changing the EDPUT while drawing a laser line can in fact produce different grayscale effects that are subdued but very pleasing to the eye. This can be accomplished by changing the power or duty cycle while the laser is etching different sections of the graphic; by changing the scan speed while the laser is etching different sections; or by changing the distance from the laser to the work piece as the laser is etching different sections. Also, the laser could etch one section at one speed or power or distance and another section at a different power or speed or distance. All of these methods will produce graphics with grayscale type effects which contain sections with perhaps similar colors but different tonal characteristics or degrees of color intensity.

Laser-etched graphic patterns on wood fiber products such as MDF and particle board produced unexpected extraordinary results in terms of the attractiveness of the new aesthetics and the relative inexpensive cost in providing the same, i.e. pennies per square foot.

MDF may be a particularly preferred material. The authors noted that lazing directly on these products produce yet another unusual and appealing aesthetic. For example, lazing wood grain graphic patterns directly on MDF produces a very real looking wood grain product unlike printing wood grain patterns on paper and laminating the same to wood composites. The laser actually engraves the pattern directly on the surface of the MDF and thus it appears integral to the surface. The traditional wood grain laminates do not have such an appearance because the pattern is "printed" on the surface and not integral to it. Further, laser-etched wood fiber products such as MDF and particle board can, for the first time, generate a host of new design possibilities including wood grain replication without the significant expense associated with providing a veneer or laminate on the wood fiber product substrate. The appearance of the wood grain lazed etching on MDF indeed appears like actual wood grain because the pattern is lazed in the wood and has the necessary depth to appear like actual wood grain. The particle board could be sanded prior to lazing. Of course, another significant advantage of laser etching wood grain patterns on MDF and the like is the significant reduction in cost. By eliminating the need for surfacing materials and directly lazing the wood grain pattern on the MDF, the unit costs will decrease significantly.

Further, laser etching wood grain patterns directly on medium density fiberboard and particleboard substrates generate unexpected but extraordinary environmental and energy benefits. As revealed earlier Engineered Wood Products typically consist of substrates such as medium density fiberboard or particleboard coupled with surfacing materials such as High Pressure Laminates. The High pressure Laminates provide the wood grain surface appearance. High Pressure Laminate products are a composition of paper, phenolic resin, melamine and/or plastic materials. Each material has a production process that consumes volumes of raw materials: kraft papers, organic, inorganic & petroleum based chemicals, plastics, and papers. The High Pressure Laminate process alone is associated with sizable energy consumption and serious environmental issues.

For example, considerable energy is used to press the melamine resin impregnated paper over layers of phenolic resin impregnated kraft paper under high temperatures and pressures. The energy required is supplied by natural gas, electricity and fuel oil. Boilers further generate steam which is then used in the manufacturing process. Further, each sub process such as kraft paper production is associated with large energy consumption. All of this energy used to manufacture the high pressure laminate surface material used on Medium Denisty Fiberboard and Particle Board is eliminated or reduced when the wood grain fiber surface is provided by a simple laser etching process, which itself uses a relatively insignificant amount of electricity. The environmental problems associated with the production of high pressure laminates are complex and significant. The production of paper alone produces environmental effluents that generate horrible odors in the community. Anyone driving through a city or town where a paper plant is located will immediately notice the bad odor diffusing through the community because of the effluents associated with the paper production. Of course, the production of the High Pressure Laminate process itself is associated with critical environmental issues, such as the disposal of the glue or phenolic resin, the handling and disposal of sander dust from sanding the back of the laminate, the handling and disposal of waste and recycled water, maintenance of dust collection systems to deal with the air emission from the cutting and sanding operations, the incineration of resin fumes from the resin manufacturing and other hazardous waste. All of these environmental issues associated with the production of the High Pressure Laminate surface material used on medium density fiberboard and particleboard are absolutely eliminated when the wood grain fiber surface is provided by a simple laser etching process.

Finally, a very significant benefit is associated with eliminating the high pressure laminate on wood fiber products—elimination of the distribution and warehousing of laminate products before they are shipped to the company which applies the laminate to the surface of the wood fiber product. This complex freight, distribution and warehousing system is replaced with a computer directory which contains digital files of different wood grain patterns to laze directly on wood fiber products.

Other patterns can be lazed on these products to produce new patterns such as floral or paisley directly on the wood fiber product surface. The wood fiber product can be coated in traditional manners to provide a protective surface coat.

Controlling the EDPUT here determines the depth of engraving and can range from lightly engraved and barely noticeable to very heavily engraved taking the appearance of a branded logo burnt in wood. One of the keys to creating a realistic wood grain and other graphic patterns on MDF is to insure that sufficient EDPUT is provided to actually affect the surface of the material so that the pattern is engraved into the surface. The ability to change the EDPUT while drawing a line is another key that allows for a more realistic wood grain pattern by lazing different sections with different tonal characteristics. Also, if a coating or paint were used to attain a certain finish, there must be enough EDPUT applied to the surface to achieve an acceptable look. Multiple layers of coatings could be applied such that graphics of different colors could be achieved by lazing only the top coat. In this manner, the lazed graphic would be the color of the underlying coating. The authors discovered that even attractive wood grain patterns can be lazed on particle board with these embodiments.

The advantages of adding a new laser etching technique to the production of engineered wood fiber products are numerous and significant. First, the new aesthetics provided by engraving the pattern in the surface vs. conventional printing processes of "painting" the pattern on the surface will lead to higher market shares and new market possibilities. For example, the market share of engineered wood fiber products will surely increase due do the new design possibilities and much lower cost versus traditional methods. Wood grain patterns laser etched directly on wood fiber products and particle board can obsolete the expensive veneer process and the cheaper looking laminate process. Further, new graphics and patterns can be provided on wood fiber products and particle board that are not commercially possible or economically feasible with current technology. Second, the cost to laser-etch graphics and patterns on engineered wood fiber products would be pennies per square foot, and thus very economical. Third, the savings in working capital and inventory to the laminate and wood fiber product manufacturer are considerable because only base products need to be kept in stock (since the lazing differentiates the final product at the last step in the process chain). Also, manufactures will now have the chance to laze patterns and logos on excess inventory and products that did not sell well. Finally, the opportunity to provide custom individually personalized engineered wood fiber product constructions are, the first time ever, a reality. This novel technique to print wood fiber products with a laser offers a significant advantage for mass customization. The customer could specify the exact graphic design and the wood fiber products manufacturer could provide that in one short run, economically impossible with conventional laminate printing processes or wood veneer process. The options for creating new and exciting decorative products for residential and commercial markets are essentially infinite.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternatives which might be predictable to a person having ordinary skill in the art. For example, other materials, values and numbers can be used. The techniques can be used for a laser method of forming a graphic, logo or pattern on a material by scribing the material with a laser beam and controlling an energy density per unit time during the scribing, where the energy density per unit time is defined as: the continuous laser power (watts) divided by the speed of the laser spot(mm/sec$^2$), where continuous power is a continuous power output of the laser during the scribing, area of spot is an area of a spot formed by the laser beam on the material when the laser beam is stationary relative to the material, and speed is a speed of the laser beam relative to the material during the scribing, wherein the material is a engineered wood fiber product and wherein said energy density per unit time is controlled in a way to prevent undesired defects, melting, charring or burn-through, the EDPUT can be changed on the fly to produce grayscale patterns and graphics. Different laser configurations and continuous laser print-on-the fly process can be used, and different product designs can be obtained. These can be used for advertising by laser etching logos on wood fiber products, or for other purposes. Lazing can be carried out before the protective coat is applied, or lazing can be carried out after the protective coat is applied and then adding another protective coat. The engineered wood fiber products can be dyed after lazing. Moreover, any form of coating can be applied to the lazed wood surface including but not limited to stains, varnishes, polymers, powder coatings, etc.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cell phone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method of engraving an engineered wood fiber substrate, comprising:
    obtaining a pattern or graphic having different portions to be etched with different amounts of applied energy to produce an effect where at least a first portion of the pattern or graphic is more deeply etched into an engineered wood fiber substrate than at least a second portion;
    producing an output to control a laser, the output includes information to etch the first portion of the pattern or graphic more deeply than the second portion; and
    etching the pattern or graphic having the first portion more deeply etched than other portions on an engineered wood fiber substrate, wherein at least a section of the first portion or the second portion is etched by the laser at an EDPUT value between 2 watts-sec/mm$^3$ and 159.24 watts-sec/mm$^3$.

2. A method as in claim 1, wherein the engineered wood fiber substrate is MDF, and the pattern or graphic is a wood grain pattern formed on the MDF.

3. A method as in claim 1, wherein the engineered wood fiber substrate is particleboard, and the pattern or graphic is a wood grain pattern formed on the particleboard.

4. A method as in claim 1, wherein the output controls etching of the engineered wood fiber substrate over at least one dimension which is greater than 24 inches.

5. A method as in claim 1, wherein the output controls etching of the engineered wood fiber substrate over at least one dimension which is greater than 48 inches.

6. A method as in claim 1, wherein the output controls etching of the pattern or graphic over a distance greater than the native capability size of a single laser.

7. A method as in claim 6, further comprising maintaining the laser stationary and moving a scan head to a first position with a linear motor and etching a first section of the engineered wood fiber substrate and subsequently moving the scan head to a second position with the linear motor and etching second section of the engineered wood fiber substrate.

8. A method as in claim 1 wherein said etching of the pattern or comprises etching a first section then moving either the engineered wood fiber substrate or the laser beam and etching a separate second section.

9. A method as in claim 8, wherein said etching of the first and second sections is performed at different times by the same laser.

10. A method as in claim 8, further comprising producing outputs for a first laser to etch the first section and for a second laser to etch the second section.

11. A method as in claim 6 wherein the output controls movement of controlled mirrors which change a position of the laser beam with respect to the engineered wood fiber substrate.

12. A method as in claim 6, further comprising using a beam splitter to split a beam from the laser beam into multiple output beams.

13. A method as in claim 6, further comprising controlling the movement of the engineered wood fiber substrate and changing an output position of the laser beam in synchronization with the movement of the engineered wood fiber substrate.

14. A method as in claim 8, further comprising maintaining a consistent pattern at a seam portion between the first and second sections.

15. A method of applying a pattern or graphic to an engineered wood fiber substrates, comprising the steps of:
defining a wood grain pattern to be formed on a surface of a material which comprises wood fiber, the wood grain pattern having different portions which are intended to be etched at different EDPUT values to produce an effect where the different portions of the wood grain pattern are etched at different depths measured from the surface of the material;
defining EDPUT values between 2 watts-sec/mm$^3$ and 159.24 watts-sec/mm$^3$ for etching the different portions of the wood grain pattern;
producing a controlling output for a laser which is based on the wood grain pattern and the defined EDPUT values which causes the different portions of the wood grain pattern to be formed in the material at different depths; and
laser etching the wood grain pattern in the material in one continuous operation.

16. A method as in claim 15, wherein the material is MDF.

17. A method as in claim 15, wherein the material is particleboard.

18. A method as in claim 15, wherein the controlling output produces the wood grain pattern over at least one dimension which is greater than 24 inches.

19. A method as in claim 15, wherein the controlling output produces the pattern over a distance which is greater than the size of an area that can be natively etched by a single laser.

20. A method as in claim 1, wherein said etching of the pattern or graphic is performed at a laser power between 1,000 and 5,000 W.

21. A method as in claim 1, wherein said etching of the pattern or graphic is performed at a laser speed between 5 and 60 m/s.

22. A method as in claim 1, wherein the EDPUT value at which at least a section of the pattern or graphic is etched by the laser is between 50 watts-sec/mm$^3$ and 159.24 watts-sec/mm$^3$.

23. A method according to claim 15, wherein said laser etching is performed with a laser power between 1,000 and 5,000 W.

24. A method according to claim 15, wherein said laser etching is performed with a laser speed between 5 and 60 m/s.

25. A method as in claim 15, wherein the wood grain pattern is a raster graphic and the output further comprises raster graphic information related to the wood grain pattern.

26. A method as in claim 15, wherein the controlling output comprises data for operating the laser at an EDPUT value between 50 watts-sec/mm$^3$ and 159.24 watts-sec/mm$^3$.

27. A method as in claim 1, wherein the EDPUT value at which at least a section of the pattern or graphic is etched by the laser is between 2 watts-sec/mm$^3$ and 19.9 watts-sec/mm$^3$.

28. A method as in claim 15, wherein the controlling output comprises data for operating the laser at an EDPUT value between 2 watts-sec/mm$^3$ and 3.98 watts-sec/mm$^3$ to laser etch at least a section of the wood grain pattern.

* * * * *